United States Patent
Maughan

[11] Patent Number: 6,146,045
[45] Date of Patent: Nov. 14, 2000

[54] TRIPLE SEAT NON-ARTICULATING IDLER ARM SOCKET

[75] Inventor: Garth B. Maughan, Delta, Ohio

[73] Assignee: Dana Corporation, Toledo, Ohio

[21] Appl. No.: 09/033,479

[22] Filed: Mar. 2, 1998

[51] Int. Cl.[7] ....................................... F16D 1/12
[52] U.S. Cl. .......................... 403/165; 403/135; 403/140; 403/147; 280/93.508
[58] Field of Search ............................. 403/164, 165, 403/147, 143, 120, 119, 140, 135, 145; 280/93.502, 93.507, 93.508, 93.51, 93.511

[56] References Cited

U.S. PATENT DOCUMENTS

| | | | |
|---|---|---|---|
| 2,846,251 | 8/1958 | Herbenar | 280/93.508 |
| 2,880,026 | 3/1959 | Moskovitz | 403/140 |
| 2,937,033 | 5/1960 | Herbenar | 280/93.508 |
| 2,944,829 | 7/1960 | Herbenar . | |
| 2,974,975 | 3/1961 | Thomas | 280/93.508 |
| 3,112,123 | 11/1963 | True . | |
| 3,210,108 | 10/1965 | Herbenar . | |
| 3,329,453 | 7/1967 | Patton | 280/93.508 |
| 3,352,583 | 11/1967 | Patton | 403/147 |
| 3,361,459 | 1/1968 | Marquis et al. . | |
| 3,411,803 | 11/1968 | Melton et al. | 280/93.508 |
| 3,945,737 | 3/1976 | Herbenar . | |
| 4,101,227 | 7/1978 | Herbenar et al. . | |
| 5,529,420 | 6/1996 | Henkel et al. | 403/135 |
| 5,607,249 | 3/1997 | Maughan . | |
| 5,904,436 | 5/1999 | Maughan et al. | 403/140 |

*Primary Examiner*—Terry Lee Melius
*Assistant Examiner*—Kenneth Thompson
*Attorney, Agent, or Firm*—Rader, Fishman & Grauer PLLC

[57] ABSTRACT

A non-oscillating joint assembly is disclosed having a bracket with a first end having a tapered bearing portion and a flange located longitudinally upwardly of the tapered bearing portion. The bracket is received in socket member having a first housing. A cap bearing is located in the housing and has a tapered inner bore that matingly engages the bracket tapered bearing portion. The tapered bearing portion is slightly larger than the tapered inner bore to provide a radial pre-load on the cap bearing. An annular bearing is also located in the housing and is positioned so as to contact an upper surface of the flange. A closure member is located below the cap bearing and cooperates with a rim of the housing which is crimped over to securely hold the components in position and also provide an axial pre-load on the cap bearing. Similarly, a second housing on the socket member has a second end cap bearing and a second annular bearing that receive the stud. The stud also includes a flange and a tapered bearing portion. The assembly of the components in the second housing is similar to the first housing. Thus, looseness and end play in the joint assembly is eliminated.

15 Claims, 4 Drawing Sheets

TRIPLE SEAT NON-ARTICULATING IDLER ARM SOCKET

FIELD OF THE INVENTION

The present invention relates to non-oscillating socket joints having reduced levels of axial and radial end play.

BACKGROUND OF THE INVENTION

Non-oscillating joints are applicable to a wide range of applications, including Pitman-idler arms used in steering linkages of automotive vehicles. Such joints typically include a cylindrical housing member adapted to receive a bearing together with a portion of a stud. The bearing reduces the amount of friction between the housing and the stud while frequently adapting for wear induced looseness between the stud and housing members.

Such joints have several disadvantages. Typically, the stud head must be forced into the bearing or the bearing must be forced into the socket. Extremely tight tolerances are required to ensure an adequately tight joint. Even with such tolerances, some bearings may crack during assembly, particularly when very rigid, stiff, inelastic materials are used. To reduce cracking, heavier material is often used together with slots within the bearing itself. Load distribution in such slotted bearings typically results in undesired wear between the various components. Further, the bearings of such joints are adapted for only limited wear, resulting in joint failure as stud head rotating torque decreases and axial end play increases.

SUMMARY OF THE INVENTION

The present invention is directed to a non-oscillating joint assembly that is easy to assemble and provides an extremely tight joint having no longitudinal or radial play, but still permits necessary rotation about a longitudinal axis. The joint assembly of the present invention also compensates for wear by having tapered bearing surfaces and axial and radial compression pre-loads. The joint assembly is applicable to a wide variety of applications, including Pitman-idler arms of steering linkages for automotive applications.

The joint assembly of the present invention includes a bracket having a first end that includes a tapered bearing portion and a second end having a bracket mounting portion. A radial flange is located on the bracket longitudinally inboard of the tapered bearing portion and includes an upper bearing surface and a lower bearing surface. A socket member receives the bracket within a housing having a bore with a first diameter. In addition, a generally hollow, cylindrical split cap bearing having a tapered inner bearing surface matingly contacts the tapered bearing portion of the bracket in the housing. A top surface of the cap bearing contacts the lower bearing surface of the flange. Further, an annular bearing is received in the housing and contacts the upper bearing surface of the flange. Thus, the flange is axially captured between the cap bearing and the annular bearing and cooperates with the tapered bearing portion to create a triple seat bearing arrangement. Also, a closure member is provided for preventing dirt and debris from entering the joint assembly. A rim on the housing is crimped over to securely hold the joint assembly together. In addition, crimping produces an axial pre-load on the bearing assembly. To assist in pre-loading, the flange acts as a relatively rigid member and transfers axial pre-load forces to both the cap bearing and the annular bearing. Moreover, as the tapered bearing portion firmly seats in the tapered inner bearing surface of the cap bearing, the cap bearing expands radially outwardly creating a radial pre-load. The cap bearing of the present invention can further include a plurality of lubrication channels and a circumferential recess about its outer periphery to facilitate compression. The cap bearing may also include a plurality of circumferentially spaced apart ribs that deform upon installation into the housing and during radial loading.

The axial and radial pre-loading in the present invention provides a greater range of tolerances in manufacturing the components. Increased tolerances result in reduced production costs and reduced scrap rates. The axial and radial compression pre-loads also maintain tightness in the joint assembly by compensating for wear.

The present invention also provides for a second housing having a bore with a second diameter located at an opposite end of the socket member. The second housing receives a stud having a threaded fastening portion at one end and a tapered bearing portion at an opposite end with a flange located therebetween. The tapered bearing portion of the stud is received within a second cap bearing having a similar design to the first cap bearing, mentioned above. A second annular bearing is also positioned to be adjacent the flange. A second closure plate is further provided and the second housing is crimped over the second closure plate providing an axial and radial pre-load on the joint assembly.

Accordingly, the present invention provides a joint assembly having no longitudinal or radial end play and reduced production costs due to the use of increased manufacturing tolerances. Moreover, the joint assembly of the present invention has an increased service life by reducing unwanted end play.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
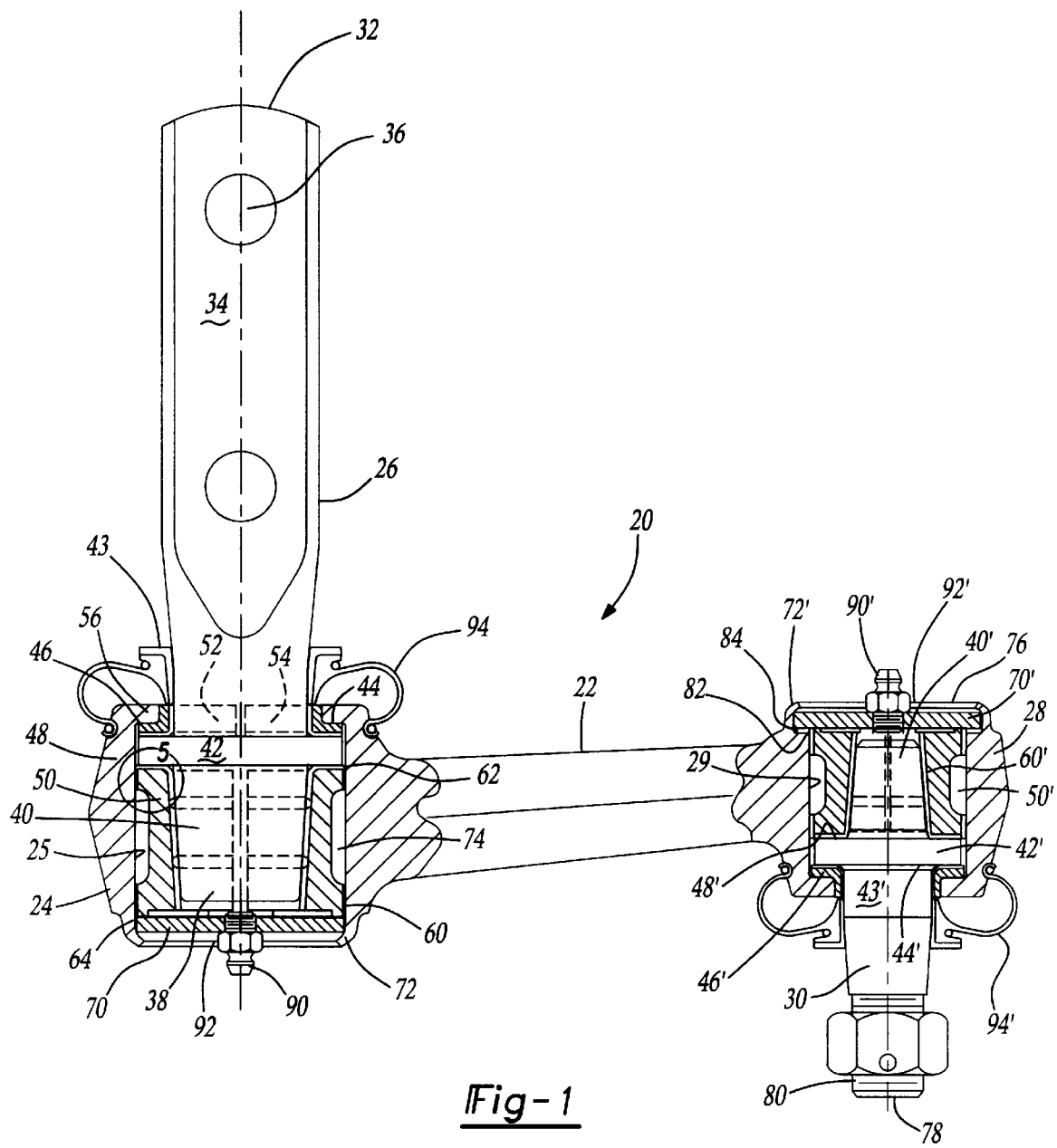
FIG. 1 is a partial cross-sectional view of a non-articulating joint assembly according to the present invention.

FIG. 1 shows a non-articulating joint assembly 20 including a generally metallic socket member 22 having a first housing 24 and a first bore 25 adjacent one distal end that receives a generally metallic bracket 26 and a second housing 28 and a second bore 29 near a second distal end that receives a generally metallic stud 30.

Bracket 26 has a first end 32 located adjacent to a bracket mounting portion 34 that is generally concave and includes a number of openings 36 that allow attachment of bracket 26 using conventional fastening techniques. A second end 38 of bracket 26 is defined by a tapered bearing portion 40 having a generally truncated conical shape that tapers inwardly toward second end 38. A radially outward flange 42 is located longitudinally inwardly of tapered bearing portion 40. Thus, tapered bearing portion 40 is spaced farther from bracket mounting portion 34 than is flange 42. A reduced neck portion 43 is located above flange 42, on an opposite side from tapered bearing portion 40.

Flange 42 has an upper bearing surface 44 that contacts an annular bearing 46 and a lower bearing surface 48 that engages a cap bearing 50. Thus, flange 42 is axially captured between annular bearing 46 and cap bearing 50. Annular bearing 46 is shown having a first half 52 and a second half 54 that surround neck portion 43. In addition, annular bearing 46 has an L-shaped cross-section and directly seats against a radially inward lip 56 on first housing 24. Preferably, annular bearing 46 is fabricated from plastic to provide a relatively soft wear surface that reduces wear on both lip 56 and flange 42. However, any suitable material can be used.

Cap bearing 50 has a tapered inner bore 60 that matingly engages tapered bearing portion 40. Preferably, inner bore 60 is slightly smaller than tapered bearing portion 40 to cause outward expansion of cap bearing 50 and reduce looseness in joint assembly 20. Tapering of inner bore 60 and bearing portion 40 provides a number of benefits. First, a much tighter joint can be obtained versus using a cylindrical element located in a cylindrical bore. In the present invention, when tapered bearing portion 40 is inserted into inner bore 60, cap bearing 50 outwardly expands to accommodate bearing portion 40, creating a radial pre-load on cap bearing 50. The outward expansion tends to eliminate any play or looseness that would otherwise be caused by tolerance stack-up. Second, as wear occurs in the joint, tapered bearing portion 40 will tend to remain in contact with inner bore 60 due to the radial pre-loading of cap bearing 50. Third, manufacturing tolerances can be relaxed because of the tapering design. As a result, reduced costs for manufacturing equipment and reduced scrap rates can be achieved.

An upper surface 62 of cap bearing 50 is designed to engage lower bearing surface 48 on flange 42. Similarly, a lower surface 64 of cap bearing 50 engages a closure plate 70 that is positively retained within first housing 24 by completely or partially crimping lower rim 72. The crimping of lower rim 72 also produces an axial pre-load on closure plate 70, cap bearing 50, bracket flange 42 and annular bearing 46. Flange 42 acts as a relatively rigid member to assist in axially pre-loading both cap bearing 50 and annular bearing 46. Axial pre-loading produces a tight joint by eliminating looseness and placing cap bearing 50 in a state of axial compression. Preferably, but optionally, cap bearing 50 includes a circumferential outer groove 74 to facilitate axial compression. Once again, radial and axial pre-loading of the components reduces the need for close tolerances and increases savings in manufacturing equipment and scrap. Outer groove 74 also reduces the amount of material required to form cap bearing 50, thereby saving material costs. Thus, a triple seat non-articulating joint is provided according to the present invention.

A similar joint construction is shown involving stud 30, which is received in second housing 28. However, the orientation and size are different. Second housing 28 is illustrated as being generally smaller than first housing 24. Stub 30 is also generally smaller than bracket 26 and projects vertically downwardly as opposed to the vertical upward orientation of bracket 26. Similar features and components have been labeled with primed numbers to show their general correlation. Accordingly, unless otherwise described, the primed components share the same features as their non-primed counterparts.

Stub 30 has a first distal end 76 defined by a tapered bearing portion 40' and a second distal end 78 having a threaded connecting portion 80. Tapered bearing portion 40' matingly engages a tapered inner bore 60' in cap bearing 50' and creates a radial pre-load on cap bearing 50'. A flange 42' is also provided on stub 30 longitudinally in between tapered bearing portion 40' and threaded connecting portion 80. Flange 42' has an upper bearing surface 48' that engages cap bearing 50' and a lower bearing surface 44' that engages an annular bearing 46'. A neck portion 43' is adjacent flange 42' opposite tapered bearing portion 40' and is surrounded by annular bearing 46'. A closure plate 70' is located above cap bearing 50' and is mechanically retained by inwardly crimping at least a portion of upper rim 72'. Crimping of upper rim 72' also produces an axial pre-load on the joint similar to the axial pre-load created by lower rim 72.

One difference between first housing 24 and second housing 28 is an additional shoulder 82 provided in second housing 28. Shoulder 82 is located adjacent to upper rim 72' and provides a recess 84 that allows a relatively larger diameter closure plate 70' to be used. In addition, a larger diameter upper rim 72' reduces the amount of push out stress on crimped over portions of rim 72'.

Optionally, but preferably, lubrication fittings 90, 90' are mounted to closure plates 70, 70' to allow re-lubricating of each joint at regular maintenance intervals. A lubrication channel system 92, 92' is also provided to facilitate distribution of lubricant to predetermined areas. Additionally, sealing boots 94, 94' are respectively connected to first and second housings 24, 28 to prevent ingress of foreign matter and retain excess lubricant. However, it should be understood that joint assembly 20 can also be designed as lubricated for life to eliminate the need for servicing.

Figure 2:
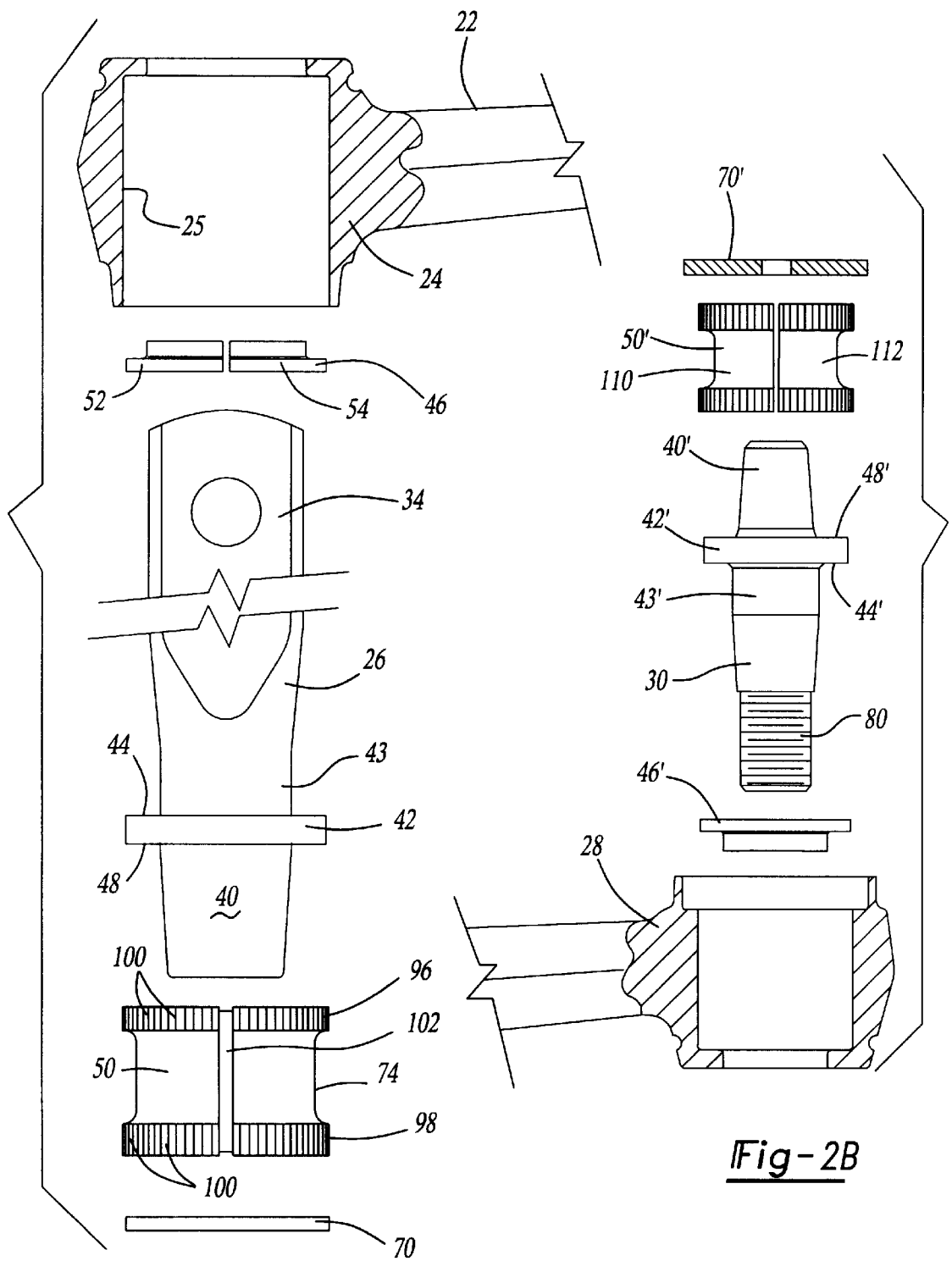
FIG. 2A is an exploded view of one end of a non-articulating joint assembly.
FIG. 2B is an exploded view of a second end of a non-articulating joint assembly according to the present invention.

FIG. 2A shows an enlarged exploded view of first housing 24, annular bearing 46, bracket 26, cap bearing 50 and closure plate 70. Annular bearing 46 has first and second halves 52, 54 to closely surround neck portion 43. If annular bearing 46 was one-piece, it could not fit over mounting portion 34 and still closely surround neck portion 43. However, depending on the size and configuration of bracket 26, it is envisioned that a one-piece annular bearing 46 could be used.

Cap bearing 50 includes upper and lower outer bearing surfaces 96, 98 separated by circumferential recess 74. Preferably, upper and lower bearing surfaces 96, 98 include a plurality of circumferentially spaced apart vertical ribs 100 to improve assembly and increase radial tightness. Ribs 100 tend to be deformed or crushed when installed into first housing 24 because cap bearing 50 has a slightly larger diameter than first bore 25. In addition, as cap bearing 50 radially expands to accommodate tapered bearing portion 40, ribs 100 can further deform depending on the elasticity of the selected cap bearing material. A single longitudinal slot 102 is cut out of cap bearing 50 to easily allow outward radial expansion. Therefore, the present invention provides a very tight joint having very little or no radial looseness.

FIG. 2B shows an enlarged exploded view of second housing 28, annular bearing 46', stud 30, cap bearing 50' and closure plate 70'. Unlike annular bearing 46, annular bearing 46' is a one-piece design since stub connecting portion 80 is smaller in diameter than neck portion 43'. Another variation is the two-piece design of cap bearing 50'. Instead of a single slot, cap bearing 50' is split into two halves 110, 112, allowing even greater radial movement during pre-loading. However, it should be understood that cap bearings 50, 50' can be any suitable configuration including, but not limited to, solid one-piece, slotted one-piece, or multiple pieces depending on the elasticity of the material being used for fabrication.

Figure 3:
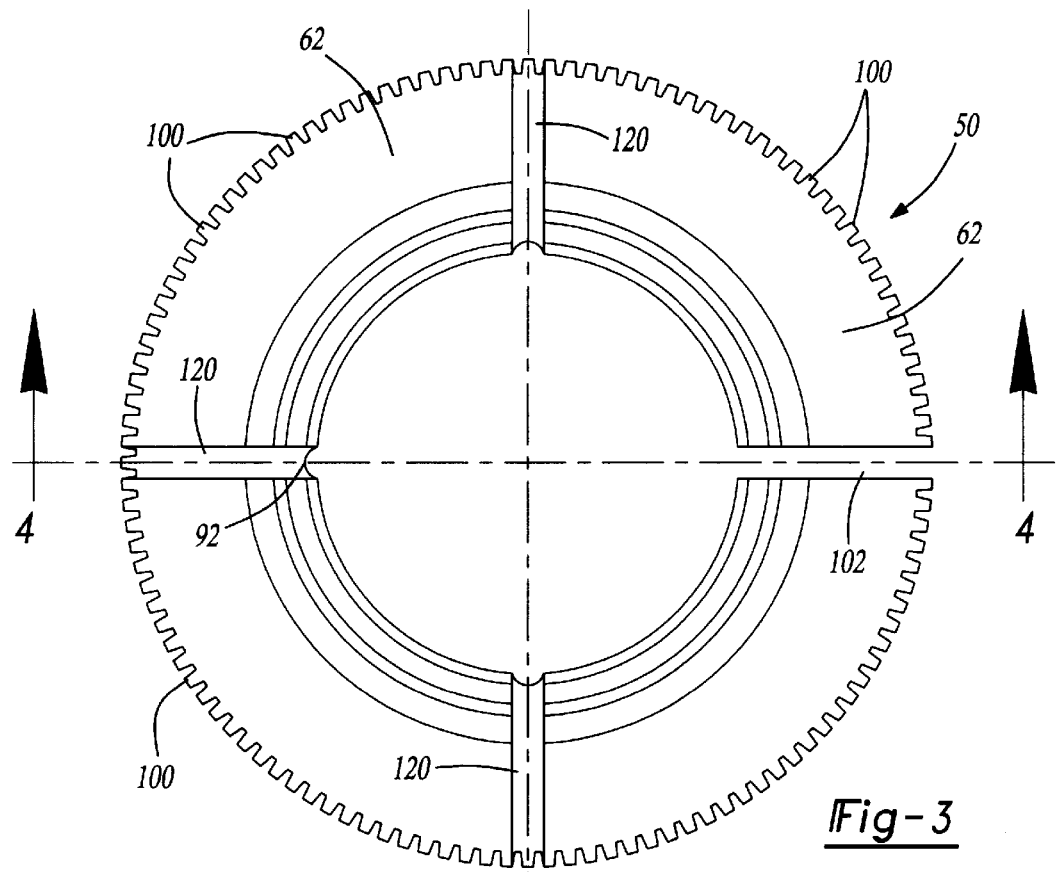
FIG. 3 is a top view of a bearing according to the present invention.

FIG. 3 shows a top view of cap bearing 50 including circumferentially spaced apart ribs 100 having generally trapezoidal profiles. However, any suitable profile can be used, including, but not limited to, triangular, square, and semi-cylindrical. In addition, several radially extending channels 120 are formed in upper surface 62 as part of lubrication channel system 92. FIG. 3 also shows longitudinal slot 102 formed in cap bearing 50 to improve flexing.

Figure 4:
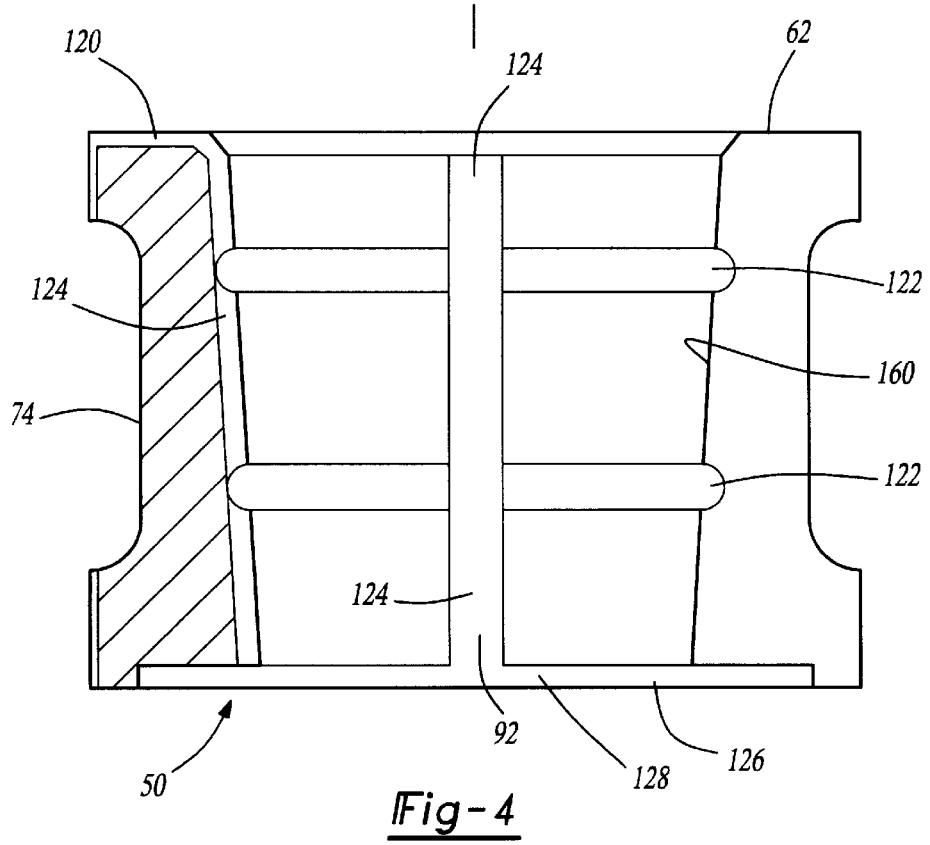
FIG. 4 is a cross-sectional view taken along line 4—4 of FIG. 3.

FIG. 4 shows a cross-section of cap bearing 50 including further channels in the lubrication channel system 92. Circumferential channels 122 are formed on tapered inner bore 60 and are spaced apart longitudinally. In addition, generally vertically extending channels 124 intersect circumferential channels 122 and connect near upper surface 62 with radial channels 120. Cap bearing 50 further includes an undercut 126 on lower surface 64. Undercut 126 provides two important benefits. First, undercut 126 defines a lubrication cavity 128 that connects lubrication fitting 90 to vertical channels 124 to facilitate movement of lubricant through lubrication channel system 92. Second, undercut 126 allows greater control of axial pre-loading by concentrating axial pre-load forces near the outer periphery of cap bearing 50 to more efficiently compress cap bearing 50.

Figure 5:
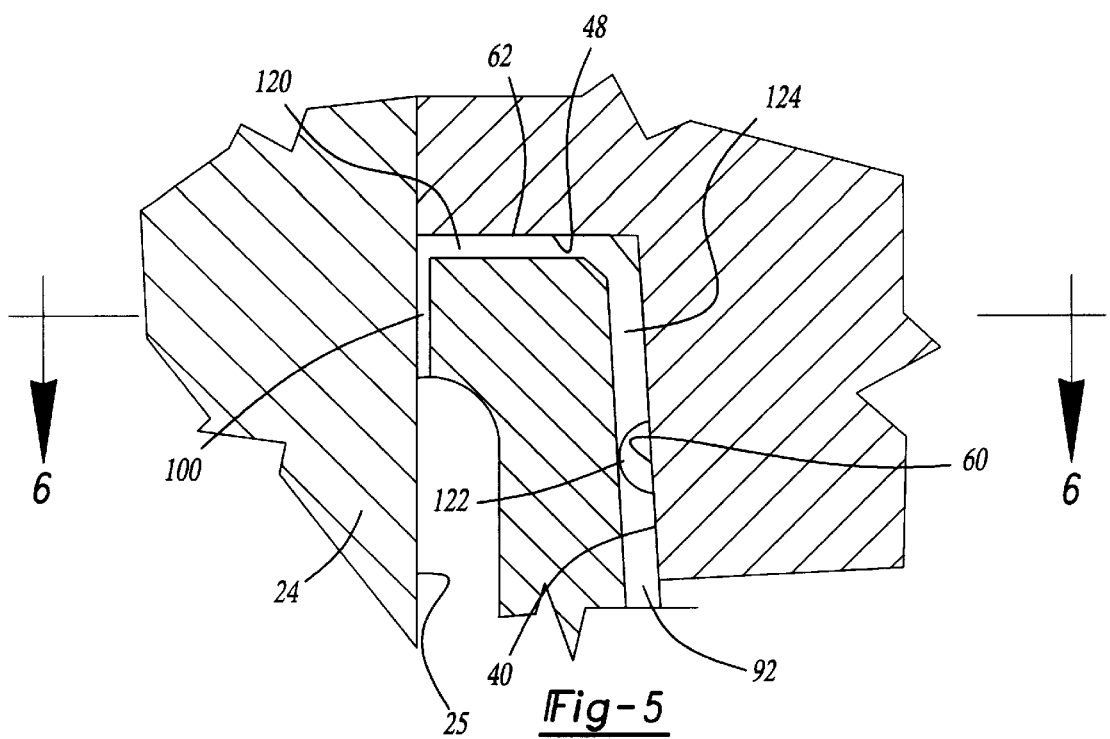
FIG. 5 is an enlarged, partial cross-sectional view of portion 5 in FIG. 1.

FIG. 5 shows an enlarged view of a portion of the present invention shown in FIG. 1. Specifically, lubrication channel system 92 is illustrated in detail. Tapered bearing portion 40 engages tapered inner bore 60. Vertical channel 124 is shown intersecting circumferential channel 122 and connecting with radial channel 120 located in upper surface 62, opposite lower flange bearing surface 48. Ribs 100 are also illustrated engaging first housing 24.

Figure 6:
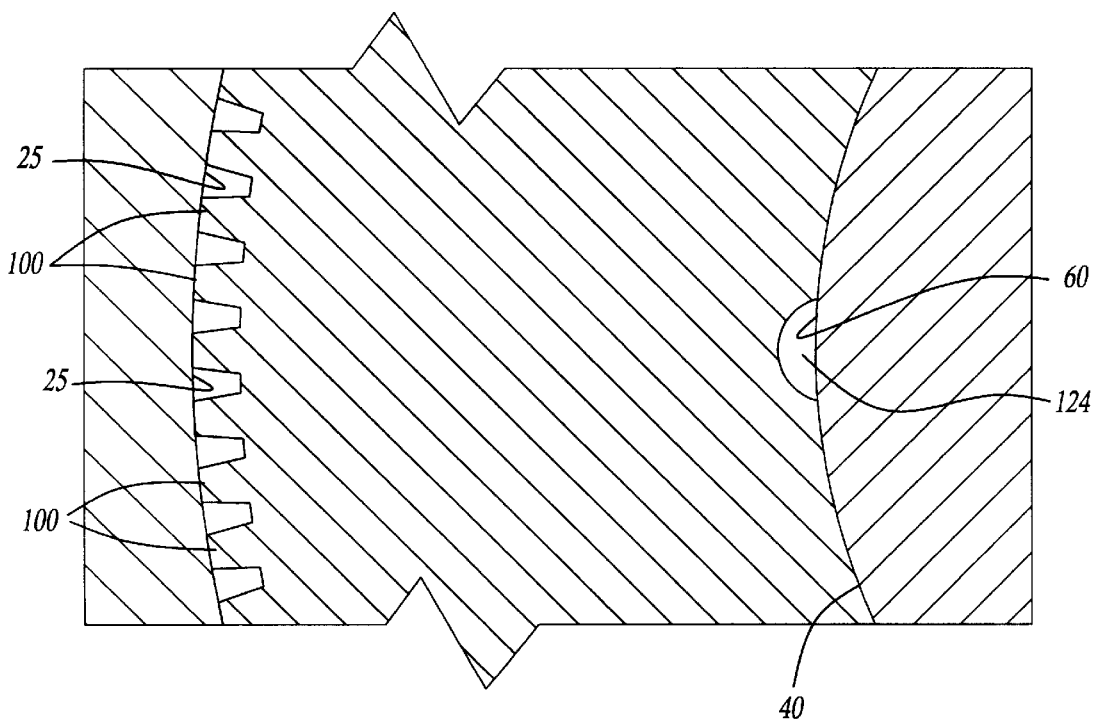
FIG. 6 is a partial cross-sectional view taken along line 6—6 of FIG. 5.

FIG. 6 is taken along lines 5—5 of FIG. 5 and shows the tapered bearing portion 40 engaging tapered inner bore 60. Vertical channel 124 contains lubricant for the bearing interface and acts as a receptacle for wear particles to help reduce the rate of further wear. Ribs 100 formed in upper bearing surface 96 are also illustrated abutting first bore 25. For sake of clarity, ribs 100 are not shown in their deformed or crushed state, however, it should be understood that ribs 100 are at least partially deformed by radial compression when fully installed.

Cap bearing 50 can be formed from any suitable materials but are preferably made of engineering plastics to provide sufficient elasticity and wear characteristics. Non-limiting examples of possible materials includes: polyethylene, nylon, or acetal. Fillers, such as glass, carbon, chalk, or mineral oil can also be used to provide improved mechanical strength and wear properties. The desired degree of elasticity for ribs 100 and cap bearing 50 are important factors when selecting a given material.

In an alternative embodiment of the invention a bellville spring washer is optionally used at either end of the bearing. If a washer is inserted in undercut 126 the undercut portion must be sized to accommodate the washer and the depth of the undercut should be selected such that the washer is bulldozed or flattened out during assembly. Thus, the thickness of the washer is slightly greater than the depth of undercut 126. The washer might be also be associated with closure plate 70. The purpose for using a bellville spring washer would be to assure that sufficient preload force is present even after long joint use.

Preferred embodiments of the present invention have been disclosed. A person of ordinary skill in the art would realize, however, that certain modifications would come within the teachings of this invention. For example, Therefore, the following claims should be studied to determine the true scope and content of the invention.

What is claimed is:

1. A non-oscillating joint assembly comprising:
   a bracket having a first end defined by a tapered bearing portion and a second end defined by a bracket mounting portion, wherein said tapered bearing portion has a generally conical shape;
   a flange located on said bracket and having an upper bearing surface and a lower bearing surface,
   a socket member including a housing having a bore with a first diameter, said socket member receiving said bracket;
   a generally cylindrical cap bearing having a tapered inner bore extending therethrough that defines a tapered bearing surface that has a generally conical shape for mating contact with said tapered bearing portion and an upper bearing surface for contact with said lower bearing surface of said flange;
   an annular bearing received in said socket member and contacting said upper bearing surface of said flange; and
   wherein said flange is axially captured between said upper bearing surface of said cap bearing and a bottom bearing surface of said annular bearing, such that said flange axially preloads said cap bearing and said annular bearing.

2. The joint assembly of claim 1, further comprising a circumferential outer groove formed on an exterior surface of said cap bearing for facilitating axial compression of said cap bearing.

3. The joint assembly of claim 1, wherein said cap bearing includes upper and lower outer bearing surfaces having a plurality of circumferentially spaced apart vertical ribs.

4. The joint assembly of claim 1, wherein said cap bearing has a plurality of lubrication channels for effectively distributing lubricant to an interface between the tapered bearing portion of the bracket and the tapered inner bearing surface of said cylindrical cap.

5. The joint assembly of claim 1, wherein said cap bearing further includes a longitudinal slot for allowing radial outward expansion of said cap bearing.

6. The joint assembly of claim 1, wherein said cap bearing has a lower surface having an undercut portion to provide a lubricant channel and improved compression pre-loading, wherein said undercut portion does not extend fully across said lower surface.

7. The joint assembly of claim 1, further comprising a second housing and a second bore with a second diameter smaller than said first diameter, said second housing receiving a second generally hollow cylindrical cap bearing having a tapered inner bearing surface and a lower bearing surface;
   a stud having a first end defined by a tapered bearing portion and a second end defined by a threaded connecting portion, said tapered bearing portion being received in said tapered inner bearing surface of said second cap bearing;
   a flange located on said stud longitudinally inboard of said tapered bearing portion, said flange having an upper bearing surface and a lower bearing surface, wherein said upper bearing surface contacts said lower bearing surface of said cylindrical cap bearing; and a second annular bearing received in said second housing and contacting said lower bearing surface of said flange.

8. A non-oscillating joint assembly comprising:

a bracket having a first end defined by a generally conical shaped tapered bearing portion;

a flange located on said bracket above said tapered bearing and having upper and lower bearing surfaces;

a generally cylindrical neck portion located adjacent to and above said flange;

a socket member for receiving said bracket, said socket member including a cylindrical housing having an upper lip, a lower rim and a bore with a first diameter;

a cap bearing received in said housing and having an outer diameter slightly greater than said first diameter and including an inner bore extending therethrough, said bore having a generally conical shaped tapered inner bearing surface for mating engagement with said tapered bearing portion of said bracket and wherein said cap bearing further includes an upper surface for contacting said flange lower bearing surface;

an annular bearing received in said housing, adjacent said upper lip, said annular bearing surrounding said neck portion of said bracket and contacting said upper surface of said flange;

a closure member located below said cap bearing and cooperating with said lower rim to prevent entry of dirt into said housing; and wherein said lower rim of said housing is at least partially deformed to provide an axial pre-load on said cap bearing and eliminate axial looseness in said bore; and wherein said flange is axially captured between said upper bearing surface of said cap bearing and a bottom bearing surface of said annular bearing such that said, flange axially preloads said cap bearing and said annular bearing.

9. The joint assembly of claim 8, wherein said tapered bearing portion of said bracket has a generally truncated cone shape that is slightly larger than said tapered inner bearing surface of said cap bearing to provide a radial pre-load on said cap bearing and eliminate radial looseness in said joint assembly.

10. The joint assembly of claim 8, wherein said cap bearing further comprises longitudinally spaced apart upper and lower outer bearing surfaces having a circumferential outer groove formed on an external surface of said cap bearing for facilitating axial compression of said cap bearing against said housing.

11. The joint assembly of claim 8, further comprising a circumferential outer groove for a facilitating axial compression of said cap bearing.

12. The joint assembly of claim 8, wherein said cap bearing has a plurality of lubrication channels for effectively distributing lubricant to an interface between the tapered bearing portion of the bracket and the tapered inner bearing surface of said cylindrical cap.

13. The joint assembly of claim 8, wherein said cap bearing further includes a longitudinal slot for allowing radial outward expansion of said cap bearing.

14. The joint assembly of claim 8, wherein said cap bearing has a lower surface having an undercut portion to provide a lubricant channel and improved compressive pre-loading.

15. The joint assembly of claim 8, further comprising a second housing and a second bore with a second diameter smaller than said first diameter, said second housing receiving a second generally hollow cylindrical cap bearing having a tapered inner bearing surface and a lower bearing surface;

a stud having a first end defined by a tapered bearing portion and a second end defined by a threaded connecting portion, said tapered bearing portion being received in said tapered inner bearing surface of said second cap bearing;

a flange located on said stud longitudinally inboard of said tapered bearing portion, said flange having an upper bearing surface and a lower bearing surface, wherein said upper bearing surface contacts said lower bearing surface of said cylindrical cap bearing;

a second annular bearing received in said second housing and contacting said lower bearing surface of said flange; and a second closure member for preventing dirt and debris from entering said second bore.

\* \* \* \* \*